(12) United States Patent
Lee

(10) Patent No.: US 6,411,428 B1
(45) Date of Patent: Jun. 25, 2002

(54) MULTI-FUNCTIONAL OPTICAL PROCESSOR USEFUL FOR FIBEROPTIC APPLICATIONS

(75) Inventor: Ho-Shang Lee, El Sobrante, CA (US)

(73) Assignee: Dicon Fiberoptics, Inc., Berkeley, CA (US)

( * ) Notice: Subject to any disclaimer, the term of this patent is extended or adjusted under 35 U.S.C. 154(b) by 0 days.

(21) Appl. No.: 09/519,028

(22) Filed: Mar. 3, 2000

(51) Int. Cl.[7] .............................. G11B 7/00; H01S 3/00
(52) U.S. Cl. ...................................................... 359/333
(58) Field of Search .............................. 359/129, 131, 359/256, 298, 302, 308, 337, 341, 349, 359, 529, 542, 546, 629, 641; 372/4, 6, 703; 385/4, 36, 42, 47

(56) References Cited

U.S. PATENT DOCUMENTS

| | | | |
|---|---|---|---|
| 5,299,056 A | * | 3/1994 | Kurata et al. ................ 359/341 |
| 5,345,329 A | * | 9/1994 | Shirai et al. ................. 359/282 |
| 5,355,249 A | * | 10/1994 | Souda et al. ................. 359/341 |
| 5,493,440 A | * | 2/1996 | Souda et al. ................. 359/341 |
| 5,499,132 A | * | 3/1996 | Tojo et al. ................... 359/281 |
| 5,661,835 A | * | 8/1997 | Kato et al. ..................... 385/92 |
| 5,812,307 A | * | 9/1998 | Naganuma .................. 359/341 |

\* cited by examiner

*Primary Examiner*—Thomas H. Tarcza
*Assistant Examiner*—Deandra M. Hughes
(74) *Attorney, Agent, or Firm*—Peter G. Mikhail; Skjerven Morrill, LLP

(57) ABSTRACT

In an optical amplifier, a filter is employed to reflect pump power into an erbium optical fiber carrying an input radiation signal, causing the signal to be amplified. The filter passes the amplified radiation signal to a partially reflecting optical interface which passes a small portion of the amplified radiation signal for monitoring purposes. Most of the amplified radiation signal is reflected by the interface and reflected again by another interface towards an output channel preferably parallel to the input channel for a compact design. Isolators may be employed between the filter and a first partially reflecting interface.

14 Claims, 4 Drawing Sheets

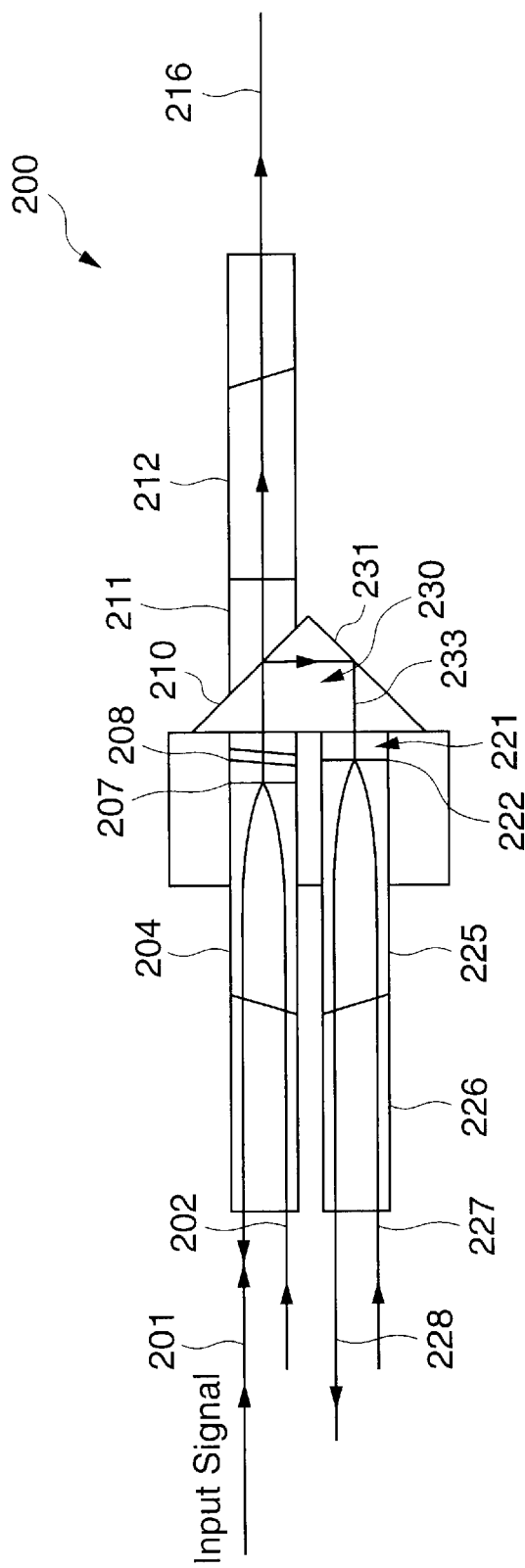
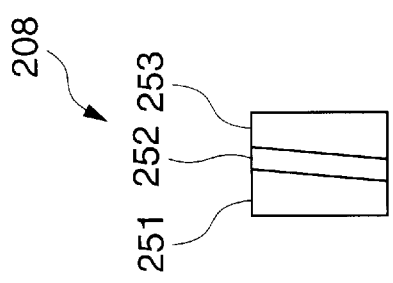
FIG. 2A
FIG. 2B

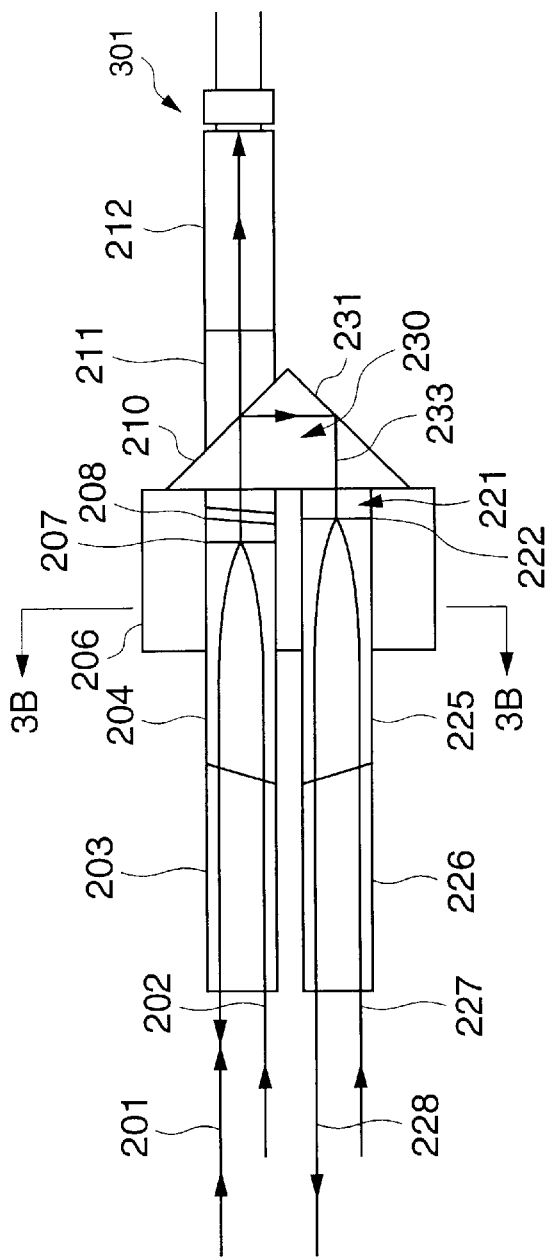
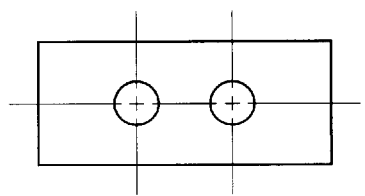
FIG. 3A
FIG. 3B

MULTI-FUNCTIONAL OPTICAL PROCESSOR USEFUL FOR FIBEROPTIC APPLICATIONS

BACKGROUND OF THE INVENTION

This invention relates in general to an optical processor, and in particular to an optical amplifier with multiple functions.

In the information age, the demand for networks of higher and higher capacities grows relentlessly, at lower and lower costs. The demand is driven by many different factors. One of factors is that the tremendous growth of the Internet, and the World Wide Web has brought more and more users online, consuming bandwidth due to data transfers involving video and images. Also, businesses are relying increasingly on high speed intranets and extranets for their day-to-day operations. Furthermore, the ultimate vision of the information age is that information can be located anywhere but accessible from everywhere as if it were located locally. Networks of enormous capacity will be required to provide the infrastructure to realize this vision. All these factors are driving. the need for more bandwidth in networks, which requires optical components as the system building blocks to be available in volume and at low cost.

FIG. 1 shows the building blocks of a prior art backward-pumped optical fiber amplifier 100. To achieve the desired functions for a typical amplifier, three branching components are used. The first branching component 102, comprising a wavelength division multiplexer and an isolator (WDM+Isolator), is used to couple the pump power in optical fiber 104 to the input erbium fiber 106 and isolate the unwanted back-flow signal from the components that are down stream from the WDM+Isolator 102. The input signal having radiation components in the bandwidth of about 1530 to 1620 nm is applied to input erbium fiber 106, and is amplified by the erbium in fiber 106 when stimulated by the pump power supplied by fiber 104 and reflected by WDM+Isolator 102. A 2% Tap Coupler 110 taps a small percentage of the amplified input signal from an optical output path of WDM+Isolator 102 for monitoring purposes. The other Wavelength Division Multiplexer (WDM ) 112 is used to merge an optical service channel 114 into the optical line 116. Splicing the above three components within the tight space usually allocated for the optical amplifier in fiberoptic applications is a formidable job

SUMMARY OF THE INVENTION

The present invention combines multiple branching functionalities into a compact package, which reduces the cost, size, labor and yet enhances the optical performance. The present invention presents component designs at low cost by integrating multiple functions into a single compact identity.

The multiple functions achieved by the various optical components in FIG. 1 includes amplifying an input optical signal by coupling pump power to an erbium fiber, isolating unwanted back-flow signal from components downstream from the amplifier and, optionally, merging an optical service signal into the output amplified signal.

This invention is based on the recognition that some or all of the above functions may be achieved by using a partially reflecting interface for the purpose of tapping a portion of the amplified input signal for monitoring purposes, while the remaining portion becomes the main output signal. A portion of the input signal that passes through or is reflected by the interface is the tapped signal that may then be used for monitoring purposes. Where such an interface is used as described above, an optional isolation function may be accomplished by means of an isolator in an optical path in the amplified input signal before such signal reaches the interface. This is an additional feature that may preferably be incorporated. In this manner, the optical path of the tapped signal need not pass through the isolator. The use of a partially reflective interface as described above enables a particularly compact package to be made which performs the above-described functions. The resulting package is smaller and cheaper than one of convention design and can be assembled with less labor, while its optical performance is enhanced over that of conventional designs.

BRIEF DESCRIPTION OF THE DRAWINGS

FIG. 2A is a partially schematic and partially cross-sectional view of a multifunction optical processor to illustrate an embodiment of the invention.

FIG. 2B is a cross-sectional view of an isolator assembly used in the processor of FIG. 2A.

FIG. 3A is a partially schematic and partially cross-sectional view of an optical processor to illustrate. an alternative embodiment of the invention.

FIG. 3B is a cross-sectional view of the processor of FIG. 3A along the line 3B—3B in FIG. 3A.

For simplicity in description, identical components are identified by the same numerals in this application.

DETAILED DESCRIPTION OF THE EMBODIMENTS

Figure 1:
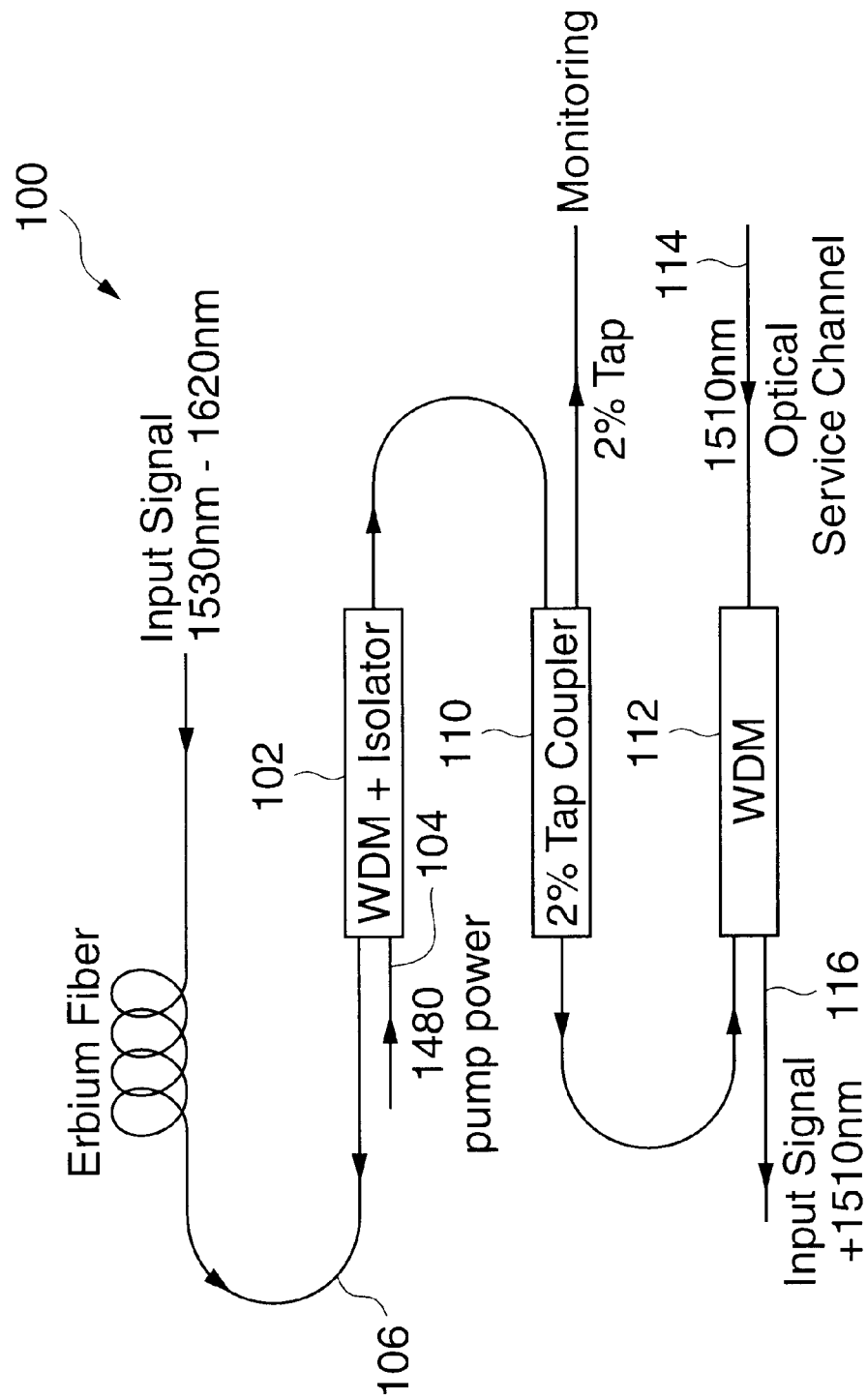
FIG. 1 is a schematic view of a conventional optical processor.

In one embodiment as illustrated in FIG. 2A, the present invention uses one or more corner prisms to bridge the optical functionalities among a set of optical functional blocks. It also provides the optical tapping post the optical regulation.

FIG. 2A shows an optical module 200 that performs four functions. The input signal is transmitted along input fiber 201 doped with erbium and the pump power is carried by fiber 202. Both beams are collimated by a GRIN lens 204. The collimated beam of pump power is reflected by a filter 207 and is coupled to input fiber 201. Filter 207 may comprise one or more layers of optical material. The input signal beam passes through the filter 207 and an isolator assembly 208 before it hits the interface 210 of the comer prism 230. The interface 210 is coated with a partially reflective coating. The coating is such that most of the optical power in the input signal is reflected and a small percentage of optical power referred to herein as the tapped signal passes through the interface. The tapped signal is coupled to a monitoring fiber 216 through a GRIN lens 212. A wedge-shaped space between the prism 230 and the GRIN lens 212 is fill with a transparent material 211.

The reflected beam at the interface 210 is reflected again at the other interface 231 of prism 230. A glass substrate 221 coated with a filtering film or films 222 is interposed between the interface 231 and the output fiber 228. The reflected beam 233 from interface 231 passes through the filter 222 and is coupled to the output fiber 228. As an option, an optical service signal carried by fiber 227 may be merged or multiplexed into the output signal in fiber 228 by means of filter 222 which serves as a WDM, where the optical service signal is reflected and coupled to the output fiber 228.

Between the GRIN lens 206 and the other GRIN lens 225, the optical signal is a well collimated parallel beam. The potential of this collimated beam can be further utilized by adding more optical processing elements such as gain flattening filter, which equalizes the optical gain of erbium fiber 201 over the operating wavelength range, such as 1530–1620 nm. Such elements may be added, for example, between the two GRIN lenses.

FIG. 2B shows the optical elements in one embodiment of isolator assembly 208. The isolator assembly can consist of a birefringent crystal 251, a Faraday rotator 252 and the other birefringent crystal 253.

FIG. 3A is a partially cross-sectional and partially schematic view of an optical processor, where a direct attachment of a photo-detector to the optical branching module is employed. The embodiment of FIG. 3A differs from that of FIG. 2A in that the monitoring fiber 215 in FIG. 2A is replaced by a photo-detector 301. FIG. 3B shows a cross-sectional view of FIG. 3A along the line 3B—3B in FIG. 3A.

Figure 4A:
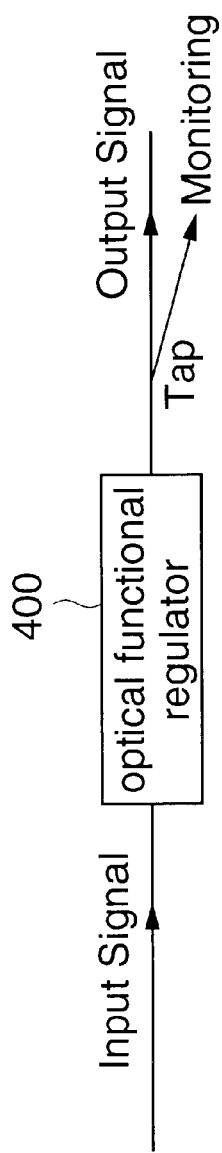
FIG. 4A is a schematic view of an optical arrangement where a tapped signal is derived from a radiation signal at a point in an optical path downstream from optical function regulation.
Figure 4B:
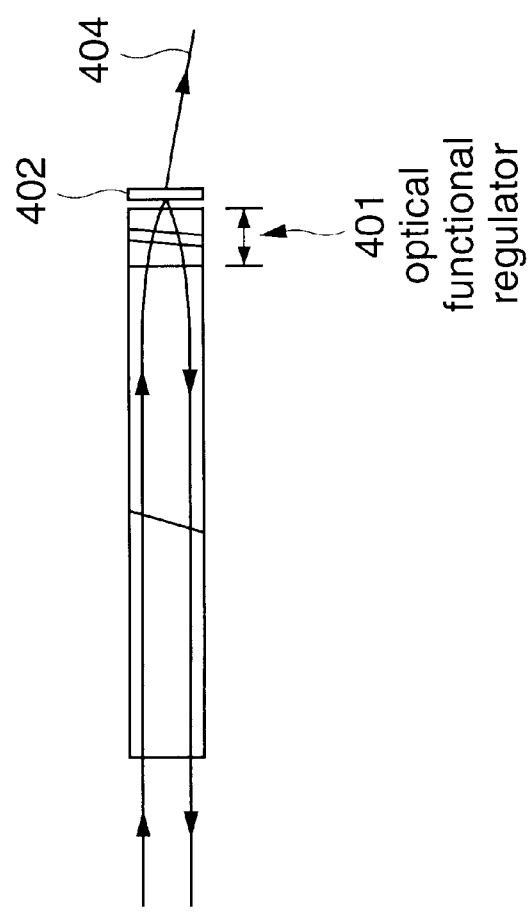
FIG. 4B is a cross-sectional view of an optical arrangement employing post regulation tapping in an optical device using optical reflection.

The optical monitoring in an optical circuit is needed for testing the reliability of the optical processor arrangement. It is desirable for the tapping of the monitoring signal to take place after the optical functional regulation 400, called post regulation tapping, as indicated in FIG. 4A. Where an optical device using optical reflection for tapping, post regulation tapping may cause the tapped signal to pass the optical regulation element twice as shown in FIG. 4B. As shown in FIG. 4B, 401 denotes an optical regulator which includes components such as isolator assembly and Gain Flattening filter. The input optical signal passes through the regulator 401 and the partially reflecting interface 402 to an output channel 404. The portion of the input signal reflected by interface 402 passes through regulator 401 a second time, so that its intensity may be so attenuated by the regulator 401 that it is not useful for monitoring purposes. By interposing a corner prism as indicated in FIGS. 2A and 2B, the tapped signal need not pass the regulator a second time but may be directed to a path not passing through the regulator a second time, so that forwarding tapping after an optical functional regulator is achievable.

From the above, it will be evident that the goal of a compact design of an optical processor combining a number of different functions has been achieved. By using a partially reflective interface to separate the amplified input signal in two portions (a main portion destined for the output channel and a minor portion for tapping), it is possible to combine the various functions including amplification, tapping and isolation in a compact design, resulting in a smaller and cheaper processor. Furthermore, since the design of FIGS. 2A, 2B, 3A, 3B are easier to align and manufacture, the amount of labor involved in splicing is also reduced and the performance of the device enhanced.

While in the preferred embodiment, a corner prism with reflective coatings thereon is used to provide the two interfaces for reflection, it will be understood that other types of interfaces may be employed and are within the scope of the invention. For example, instead of employing a prism, two separately mounted mirrors, one partially reflecting and one totally reflecting may be employed to replace the prism coated interfaces 210 and 231. While preferably the two reflecting interfaces (whether those of a prism or of two independent mirrors) are substantially perpendicular to each other, this is not required and the two interfaces may have any orientation with respect to each other; although preferably the two interfaces are not parallel to each other. Also, while preferably the input and output channels 201 and 228 are substantially parallel to each other and the input and output radiation signals travel in opposite directions for a compact design, again this is not required. For example, the second reflection by interface 231 may cause the output signal to be directed towards the right in the general direction of the tapped signal 216 in FIG. 2A. In some applications, the second interface 231 may be omitted altogether so that only a single partially reflecting interface is employed, and the reflected signal from the interface is directed to the output channel without any further reflection. The regulation function performed by isolator assembly 208 may be omitted when not required. In the preferred embodiment, the portion of the input signal reflected by the interface 210 becomes the main output signal and the portion of the input signal that passes the interfaces is the tapped signal. Particularly where no isolation function is included in the processor, the situation can be reversed, with the portion of the input signal reflected by the interface 210 being the tapped signal and the portion of the input signal that passes the interfaces becoming the output signal. All such variations are within the scope of the invention.

While the invention has been described above by reference to various embodiments, it will be understood that changes and modifications may be made without departing from the scope of the invention, which is to be defined only by the appended claims and their equivalents.

What is claimed is:

1. An optical amplifier comprising:
   a prism;
   a first optical channel carrying an input radiation signal along a direction, said channel containing a material that amplifies the radiation signal when stimulated;
   a second optical channel carrying a pump radiation signal;
   a layer that reflects the pump radiation signal towards the first optical channel or a channel optically connected thereto causing the material to be stimulated and the input radiation signal amplified, said layer passing said amplified input radiation signal;
   a first surface of the prism that passes a first portion of the amplified input radiation signal passed by the layer for monitoring and reflects a second portion of the input radiation signal passed by the layer;
   an output channel carrying the second portion of the input radiation signal reflected by the first surface of the prism; and
   a second surface of the prism that is in an optical path between the first surface of the prism and the output channel, wherein the two surfaces are not parallel to each other.

2. The amplifier of claim 1, wherein the second surface reflects the second portion of the input radiation signal reflected by the first optical interface towards the output channel or a channel optically connected thereto.

3. The amplifier of claim 2, wherein the first surface reflects the second portion of the input radiation signal along a direction substantially normal to that of the input radiation signal, and the second surface reflects the second portion of the input radiation signal along a direction substantially normal to that of the second portion of the input radiation signal reflected by the first surface.

4. The amplifier of claim 3, wherein the first and second surfaces are two faces of a prism substantially at a right angle to each other.

5. The amplifier of claim 4, wherein the input and output optical channels are substantially parallel and adjacent to the prism.

6. The amplifier of claim 1, further comprising a second layer in an optical path between the second surface and the output channel, and a third optical channel carrying and directing an optical service signal towards the second layer or a channel optically connected thereto, so that the second layer passes the second portion of the input radiation signal and reflects the optical service signal towards the output optical channel or a channel optically connected thereto.

7. The amplifier of claim 6, further comprising a GRIN lens between the output channel and the second layer collimating the second portion of the input radiation signal and the optical service signal.

8. The amplifier of claim 1, further comprising an isolator device between the second surface and the output channel.

9. The amplifier of claim 8, said isolator device comprising two birefringent crystals and a Faraday rotator.

10. The amplifier of claim 1, further comprising a GRIN lens between the input first optical channel and the layer collimating the input radiation signal and the pump radiation signal.

11. The amplifier of claim 1, further comprising a tapping channel receiving the first portion of the input radiation signal passed by the first surface.

12. The amplifier of claim 1, further comprising an isolator device between the layer and the first surface.

13. The amplifier of claim 12, said isolator device comprising two birefringent crystals and a Faraday rotator.

14. A method for optically amplifying an input radiation signal, comprising:

supplying the input radiation signal to a first optical channel along a direction, said channel containing a material that amplifies the radiation signal when stimulated;

supplying a pump radiation signal to a layer that reflects the pump radiation signal towards the first optical channel or a channel optically connected thereto causing the material to be stimulated and the input radiation signal amplified, said layer passing said amplified input radiation signal;

routing said amplified input radiation signal to a first surface of a prism that passes a first portion of the amplified input radiation signal passed by the layer for monitoring and reflects a second portion of the input radiation signal passed by the layer; and reflecting the second portion of the input radiation signal from the first surface by a second surface of the prism and directing the second portion of the input radiation signal reflected by the second surface towards an output channel, wherein the two surfaces are not parallel to each other.

* * * * *